United States Patent
Marino

[15] 3,659,641
[45] May 2, 1972

[54] CARGO CONTAINER

[72] Inventor: Frank J. Marino, 8802 Foster Avenue, Brooklyn, N.Y. 11236

[22] Filed: Oct. 3, 1969

[21] Appl. No.: 863,500

[52] U.S. Cl............................................................150/52
[51] Int. Cl..........................................................B65b 65/02
[58] Field of Search.....................150/52, 52.5, .5; 220/1.5; 52/3–5

[56] References Cited
UNITED STATES PATENTS
3,088,619   5/1963   Boucher..............................150/52 X Primary Examiner—Robert B. Reeves
Assistant Examiner—John P. Shannon, Jr.
Attorney—Philip G. Hilbert

[57] ABSTRACT

Cargo containers including a rigid pallet and a flexible covering detachably connected to the pallet for enclosing cargo carried by the pallet; the covering closely conforming to the contours of the cargo.

6 Claims, 4 Drawing Figures

Patented May 2, 1972
3,659,641
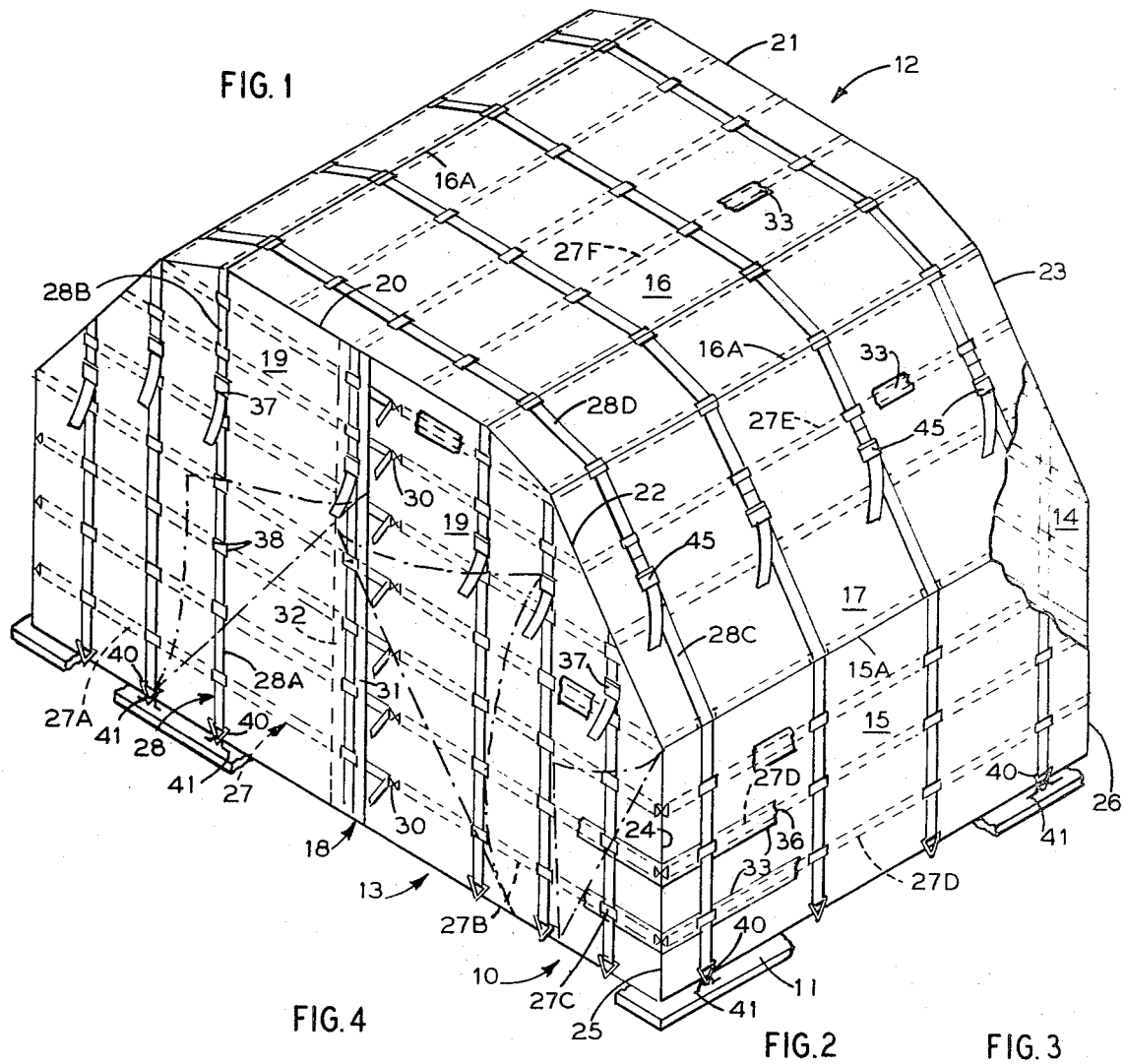
FIG. 1
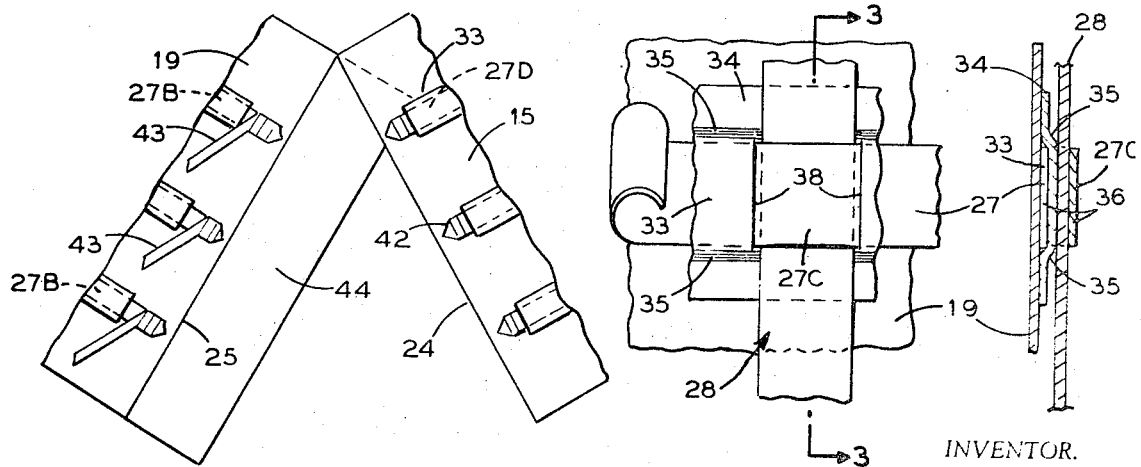
FIG. 4
FIG. 2
FIG. 3
INVENTOR.
Frank J. Marino
BY
ATTORNEY

CARGO CONTAINER

BACKGROUND OF THE INVENTION

With the progressive increase in the movement of cargo by air transport; and more particularly, the movement of relatively small items in packages, cartons, and the like, a need has been apparent for means for assembling and arranging such items in unitary form to facilitate handling, load and unloading the same.

Known cargo containers are of the fixed volume type which must have an arbitrary capacity and either completely or partially must have utilized at any given loading. Further, such containers are cumbersome and require substantial storage space when not in use.

Since known container constructions necessarily include frame portions and a covering thereover; such constructions require substantial amounts of material and labor which leads to relatively high costs for the same.

Accordingly, an object of this invention is to provide an improved cargo container which includes a base pallet and a flexible covering detachably secured thereto; the covering being adapted to closely conform to the contours of cargo disposed on the base pallet.

Another object of this invention is to provide a cargo container of the character described, wherein the flexible covering may be folded flat against the pallet; or separated from the pallet and rolled up to facilitate storage of the same when the container is not in use.

A further object of this invention is to provide a cargo container of the character described, wherein the flexible covering thereof is provided with strap members arranged to facilitate loading operations and conforming the covering to the contours of the total cargo carried by the pallet.

Other objects of this invention will in part be obvious and in part hereinafter pointed out.

DESCRIPTION OF THE DRAWINGS

FIG. 1 is a perspective view showing a cargo container embodying the invention;

FIG. 2 is a partial front elevational view showing a detail of the webbing-panel relationship;

FIG. 3 is a sectional view thereof;

FIG. 4 is a front elevational view showing corner details of the front and end panels.

DESCRIPTION OF THE PREFERRED EMBODIMENT

As shown in the drawings, 10 designates a cargo container embodying the invention. The same comprises a rigid base or pallet member 11, which may be formed of plywood, molded plastic, metal or the like; and a flexible covering generally indicated at 12, which is detachably secured to the peripheral edges of pallet member 11.

The pallet member 11 is of rectangular shape and the covering 12 has bottom edges corresponding to the peripheral outline of said member 11. The covering 12 is formed of a moisture and wear resistant material such as nylon fabric or the like.

The covering 12 provides an enclosure for the various packages, cartons or other goods arranged on the top surface of pallet member 11. Such covering is formed of panels of fabric including a front panel 13, a back panel 14, end panels 15, a top panel 16 and sloping panels 17 which connect the top edges 15A of end panels 15 to the side edges 16A of top panel 16.

The front panel 13 is vertically split as at 18 to provide laterally related subpanels 19. The adjacent edges of top panel 16 and front subpanels 19 are interconnected as at 20, while the adjacent edges of top panel 16 and back panel 14 are interconnected as at 21. The adjacent edges of sloping panels 17 and front subpanels 19 are interconnected as at 22 while the adjacent edges of sloping panels 17 and back panel 14 are interconnected as at 23.

The vertical edge 24 of end panels 15 are unsecured to the adjacent vertical edges 25 of front panels 19 while the adjacent vertical edges of end panels 15 and back panel 14 are interconnected as at 26. It will be apparent that with this arrangement that front subpanels 19 may be manipulated as flaps to expose the interior of covering 12, when loading or unloading pallet member 11.

Means is provided for constricting the several panels forming covering 12 to conform the same to the outer contours of the goods carried on pallet member 11 up to the full volume of said covering. To this end, there are provided intersecting sets of strap means mounted on the outer surface portions of panels 13–17. Such strap means may be formed of webbing of suitable width and may be of nylon fabric or the like.

Thus, the front subpanels 19 have mounted thereon a set of parallel, horizontally extending straps generally indicated at 27 and a set of parallel, vertically extending straps generally indicated at 28. The set of horizontal straps 27 comprise longitudinally aligned pairs of strap sections 27A, 27B on the respective front subpanels 19. Buckle means generally indicated at 30 serve to detachably interconnect the adjacent ends of strap sections 27A, 27B at the juncture of front subpanels 19 where vertical marginal edge portions 31, 32 respectively thereof, overlap each other.

The strap sections 27A, 27B are held in pockets on front subpanels 19 by horizontally disposed strips of material 33 which are secured along their marginal portions 34 to the outer surface of panels 19; the strips 33 preferably being of nylon or other thermoplastic fabric, to allow for parallel heat seals as at 35 to secure said strips in place. Thus longitudinal pockets 36 are formed to carry strap sections 27A, 27B.

The vertical sets of straps 28 are made up of aligned strap sections 28A, 28B detachably interconnected by buckles generally indicated at 37. The strap sections 28A, 28B are adapted to interengage strap sections 27A, 27B at their intersection. To this end, the pocket forming strips 33 are slotted transversely thereof at spaced intervals as at 38. Thus, in threading strap sections 27A, 27B through pockets 36, spaced portions thereof 27C may be brought outwardly of strip 33 by way of a pair of adjacent slots 38. In this way, strap sections 28A, 28B may be passed beneath strap sections 27C, to thereby retain the same on panels 19.

The lower ends of strap sections 28A terminate in clasps 40 adapted to engage hooks 41 mounted on peripheral edge portions of the pallet member 11.

The end panels 15 are similarly provided with strips 33 to form horizontally extending pockets 36 for straps 27D which extend to edges 24 and terminate in a clasp 42 for engagement by hook means 43 on the terminal ends of strap sections 27B at edges 25 of front subpanels 19; a vertical marginal flap 44 on subpanels 19 overlying the joint between panel edges 24, 25. Vertical strap sections 28C, 28D extend across end panels 15, top panel 16 and sloping panels 17, intersect straps 27D on panels 15, as well as straps 27E and 27F on panels 17, 16 respectively.

Strap sections 28C and 28D are interengaged by buckle means generally indicated at 45; the strap sections 28C terminating at their lower free ends in clasps 40 for engagement with hooks 41 on peripheral portions of pallet member 11, as previously described. The vertical strap sections are similarly provided with clasps 40 on the other panels for detachable engagement with hooks 41 on the corresponding edges of pallet member 11.

The pocket forming strips 33 for straps 27D–27F are transversely slotted as previously described, to allow portions of said straps to interengage with intersecting strap portions as previously described.

In using the container 10, the covering 12 is held in distended, suspended relation to pallet member 11, by suitable suspension frame means, not shown. The lower peripheral portions of the several panels are connected to the pallet member 11 by way of clasps 40 and hooks 41. The front subpanels 19 are then adapted to be opened, wholly or in part, as indicated in dot-dash lines, in FIG. 1, to gain access to the interior of the container for loading or unloading the same.

After loading the container with the various individual cargo items, the panels of the container are conformed to the outer contours of the cargo load, by constricting the same by means of the various straps and strap sections through their respective buckles. Thus, the container 10 may present a volume and contour corresponding to the bulk and contour of its contents.

Alternatively, the covering 12 may have all of its panels interconnected at their adjacent edges; the front panel 13 being in single, undivided form. In this case, the cargo items would be preloaded directly on pallet member 11 and the unitary covering 12 would be dropped over the preloaded items from suitable suspension means; the covering then being secured to the pallet member 11 by way of claps 40 and hooks 41.

When container 10 is not in use; the covering 12 may be folded flat into contact with the upper surface of pallet member 11; or such covering may be separated from the pallet member and rolled up for storage. Thus, container 10 requires a minimum amount of storage space when not in use; yet is readily and quickly available for use with a minimum amount of manipulation.

I claim:

1. A cargo container comprising a rigid base member for carrying goods of varying bulk and outer contours and cover means of flexible, moisture resistant material, said cover means comprising top, front, back and end panels, means for detachably securing bottom edges portions of said front, back and end panels to said base member, means for conforming said panels to the bulk and outer contours of the goods carried on said rigid member and retaining the conformed condition thereof, said conforming means comprising first and second sets of strap means, means on said panels for locating one of said sets of strap means in mounted relation to said panels, the strap means of said one set of strap means being in spaced relation to each other, the other of said sets of strap means being arranged in crossing relation to said one set of strap means, the strap means of the other of said sets of strap means being interengaged with the strap means of said one set of strap means at spaced points along the length thereof, and means for adjusting the effective length of the strap means in each of said first and second sets of strap means.

2. A container as in claim 1 wherein one of said sets of strap means extend vertically of said front, back and end panels, the other of said sets of strap means extending horizontally of said panels.

3. A container as in claim 2 wherein said front panel comprises a pair of laterally adjacent subpanels, the horizontally extending strap means on said front panel comprising longitudinally aligned strap sections on the respective subpanels, and means for detachably connecting the adjacent ends of each pair of longitudinally aligned strap sections.

4. A container as in claim 3 wherein the abutting vertical edges of the front and end panels are separable, and means for detachably connecting each of the horizontal strap means on said end panels with a corresponding horizontal strap means on said front panel at the adjacent ends thereof.

5. A container as in claim 1 wherein said strap locating means comprises elongated strips of material having a width greater then that of said strap mean, said strips of material being secured along the marginal edges thereof to outer surface portions of said panels to form longitudinally extending pockets for said strap means, said strips of material being slotted transversely thereof at longitudinally spaced intervals therein to allow longitudinally spaced portions of said strap means to be threaded through pairs of adjacent slots to dispose the strap portions between each pair of slots exteriorly of said strip to permit interengagement thereof with portions of the strap means of the other set of strap means.

6. A container as in claim 5 wherein said cover means and said strips of material are formed of thermoplastic fabric, said strips being heat sealed to said panels.

* * * * *